(12) United States Patent
Foss et al.

(10) Patent No.: US 9,988,205 B2
(45) Date of Patent: Jun. 5, 2018

(54) USE OF POLYLACTIC ACID POWDERS IN THE MANUFACTURING OF BEVERAGE FILTER FIBERS

(71) Applicant: Nonwoven Networks LLC, Naples, FL (US)

(72) Inventors: Stephen W. Foss, Naples, FL (US); Jean-Marie Turra, Greer, SC (US)

(73) Assignee: Nonwoven Network LLC, Naples, FL (US)

( * ) Notice: Subject to any disclaimer, the term of this patent is extended or adjusted under 35 U.S.C. 154(b) by 192 days.

(21) Appl. No.: 15/062,667

(22) Filed: Mar. 7, 2016

(65) Prior Publication Data

US 2016/0264346 A1 Sep. 15, 2016

Related U.S. Application Data

(60) Provisional application No. 62/130,176, filed on Mar. 9, 2015.

(51) Int. Cl.
*B65D 85/808* (2006.01)
*B65D 65/46* (2006.01)
(Continued)

(52) U.S. Cl.
CPC .......... *B65D 85/808* (2013.01); *B65D 65/46* (2013.01); *B65D 85/812* (2013.01); *D04H 1/435* (2013.01); *D04H 1/587* (2013.01); *D04H 1/60* (2013.01); *D04H 13/00* (2013.01); *Y02W 90/12* (2015.05); *Y02W 90/13* (2015.05)

(58) Field of Classification Search
CPC .... B65D 85/808; B65D 85/812; D04H 13/00; D04H 1/435; D04H 1/587; D04H 1/60
See application file for complete search history.

(56) References Cited

U.S. PATENT DOCUMENTS 4,875,574 A * 10/1989 Travers .............. B65D 85/8085
206/0.5
8,828,895 B2 9/2014 Foss et al.
(Continued)

FOREIGN PATENT DOCUMENTS

WO 2012027539 A2 3/2012

OTHER PUBLICATIONS

Extended European Search Report for Application No. 16159196.1 dated Jun. 24, 2016.

*Primary Examiner* — Jeremy R Pierce
(74) *Attorney, Agent, or Firm* — Lerner, David, Littenberg, Krumholz & Mentlik, LLP

(57) ABSTRACT

A non-woven mono-component, mono-constituent poly lactic acid (PLA) web is disclosed. The web material is useful for production of infused and brewed beverage filtering media such as tea bags and other pouches and filters. The nonwoven network of PLA fibers in mono-component, mono-constituent configuration provides enhanced liquid infusion properties, superior wet strength and weight properties that surpass current beverage bags and pouches because of its unique composition and structure. The manufacture of Biodegradable Tea and Coffee filter fabrics utilizing PLA powders in place of low melt mono-component, mono-constituent fibers to improve fabric elongation and reduce cost. The addition of a Chlorine scavenger allows preserving the taste and essence of the beverage.

24 Claims, 18 Drawing Sheets

(51) Int. Cl.
*D04H 1/435* (2012.01)
*D04H 1/587* (2012.01)
*D04H 1/60* (2006.01)
*B65D 85/812* (2006.01)
*D04H 13/00* (2006.01)

(56) References Cited

U.S. PATENT DOCUMENTS

| | | | | |
|---|---|---|---|---|
| 2011/0287105 A1* | 11/2011 | Gittleman | ............... | A61K 8/046 424/501 |
| 2012/0051672 A1* | 3/2012 | Foss | ................ | D04H 1/435 383/105 |
| 2012/0160715 A1* | 6/2012 | Muvundamina | .. | A61F 13/15211 206/210 |
| 2014/0242309 A1 | 8/2014 | Foss et al. | | |

* cited by examiner

Fibers Shapes

Round

Delta

Triangle

Mock-Hollow or "C"

Flat or Ribbon

Fibers Shapes

Round

Delta

Triangle

Mock-Hollow of "C"

Flat or Ribbon

Constructions

Single Layer

Layer A - 100% of the composite

Double Layer with equal distribution

Layer A - 50% of the composite

Layer B - 50% of the composite

Double layer with unequal distribution

Multiple layers with equal distribution

Multiple layers with unequal distribution

Multiple Layers

Layers With Different Diameter
Fibers At Same Weight

Different Diameters
And Different Weights

Three Different Layer

Table 1. Comparison of Paper airflow with PLA Airflow

| Paper Gsm | PAPER airflow L/m²/s | PLA Airflow L/m²/s | PLA Increase Airflow |
|---|---|---|---|
| 16.6 | 1147 | 1680 | 146% |
| 20.9 | 951 | 1450 | 152% |
| 22 | 784 | 1340 | 171% |
| 90 | 540 | 1135 | 210% |
| 90 | 2 | 660 | 330 |

Graph A. Relationship of Breathability Properties to GSM

USE OF POLYLACTIC ACID POWDERS IN THE MANUFACTURING OF BEVERAGE FILTER FIBERS

CROSS-REFERENCE TO RELATED APPLICATIONS

The present application claims the benefit of the filing date of U.S. Provisional Application No. 62/130,176 filed Mar. 9, 2015, the disclosure of which is hereby incorporated herein by reference.

BACKGROUND OF THE INVENTION

U.S. Pat. No. 8,828,895 describes the unique method of making filter fabrics by utilizing mono-component; mono-constituent fibers made from both high and low melt temperature Polylactic Acid (PLA) fibers. Further, Published US Application 20140242309 describes improvements by creating layers of different fiber blends and different shapes of fibers to improve filtration while enhancing performance.

Even with the significant improvements given by the above, there still exists a need in the art to increase elongation of non-woven fabrics to enhance moldability. In addition, there is a need to reduce overall costs by avoiding the process of making low melt fibers.

Furthermore, many municipal water supplies add chlorine to the drinking water supplies to reduce or kill bacteria in the water system. Chlorine may significantly change the taste of the water and leave a residual or bad taste in the beverage made from the water when it is diffused through most filter fabrics. This bad taste may affect the taste of infused or brewed beverages, such as tea, coffee, and many other beverages made with this water. Thus, there is also a need in the art to decrease the amount of chlorine in the water being diffused.

In the United States, a cup of coffee is generally produced under atmospheric pressure with hot water flowing through the coffee grounds and through a filter. The resultant coffee is coloring the water from light grey to black, but still maintains a clarity. In Europe as well as most of the rest of the world, coffee is generally produced under a pressure greater than 1 atmosphere and the coffee is generally ground to finer particles. As a result, coffee is cloudy, stronger and has a "crema" or foam on the surface. Such coffee is sipped slowly to enjoy the enhanced flavor.

In all cases, there need for a tortuous path for the water to flow through a filter that will allow a fast flow, but preventing any particles from flowing into the cup. It is believed that a tortuous path will allow more complete transfer of the coffee essence from the grounds to the liquid, while at the same time increasing the "crema".

Cellulosic "paper" products have an inverse relationship of weight with porosity. As cellulosic papers get higher than 30 gsm in weight, at that point porosity approaches zero and become impermeable. In order to preserve breathability at higher basis weights, "paper" manufacturers will use large percentages of fibers bound together by binders. Further cellulose fibers swell on contact with water, further closing the pores of the paper.

There is also a need for an infusion substrate, particularly for tea and coffee, which provides rapid infusion of hot water into the tea or coffee particles, while being strong enough to keep the particles within a bag or pouch made up in substantial part or wholly of such substrate. There is also a need for heat-sealable pouch for tobacco and tobacco products (i.e. snuff and chewing tobacco).

Further, it is highly desirable that the substrate media be 100% biodegradable and not contain any inert or non-biodegradable components. It is also highly desirable that the media, including all of the production scrap, be recyclable into itself.

BRIEF SUMMARY OF THE INVENTION

Disclosed is a nonwoven web for producing beverage infusion pouches and bags consisting of a plurality of mono-component mono-constituent Polylactic Acid (PLA) fibers for forming a non-woven web through dry thermo-bonding. The mono-component mono-constituent Polylactic Acid (PLA) fibers has a crystalline portion and an amorphous PLA powder is added to the mono-constituent Polylactic Acid (PLA) fibers to act as an adhesive binding the PLA fibers together. The PLA powder is made by grinding PLA pellets and spreading the PLA powder through a sifter over the PLA fibers. The PLA powder particle size is controlled by the mesh size of the sifter. Cost is saved by not needing the PLA amorphous pellets to be extruded into a fiber and act as the adhesive as in previous techniques.

The PLA powder has a melting point below the melting point of the mono-component, mono-constituent PLA fibers allowing the PLA powder to act as an adhesive. The mono-component mono-constituent PLA fibers and PLA powders forming together pore sizes of the non-woven web that are maintained when formed into a bag or pouch and infused with hot liquids for enhancing flow. The non-woven web contains no plasticizers or surface treatment additives unlike other nonwoven webs. In addition, the non-woven web is formed without the use of plasticizers and surface treatments and is biodegradable and recyclable. Allantoin may be used to decrease the chlorine content in the infused liquid and may be bound in either the low melt PLA fibers or in the low melt PLA powder or in both in amounts from 0.1 to 2.0%. Another example of a chlorine scavenger is Sodium Thiosulfate, which bonds both chlorine or bromine to make sodium chloride or sodium bromide, removing the chlorine or bromine from the water. It is known under for example CAS# is 7772-98-7.

BRIEF DESCRIPTION OF THE DRAWINGS

FIGS. 2A, 2B, 2C, 2D, 2E, 2F, 20, 2H, and 2I illustrate one embodiments of layers;

DETAILED DESCRIPTION

Figure 1A:
FIGS. 1A, 1B, IC, 1D, 1E, 1F, 1G, 1H, 1I and 1J illustrate embodiments of fiber shapes that utilize the teachings of the present invention.
Figure 1B:
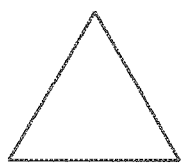
Figure 1C:
Figure 1D:
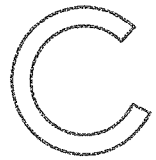
Figure 1E:
Figure 1F:
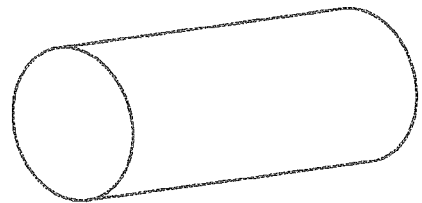
Figure 1G:
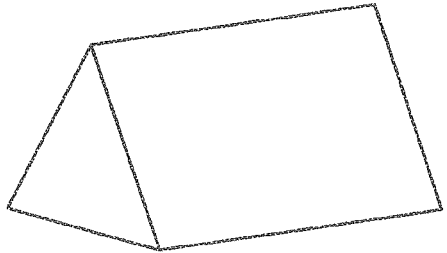
Figure 1H:
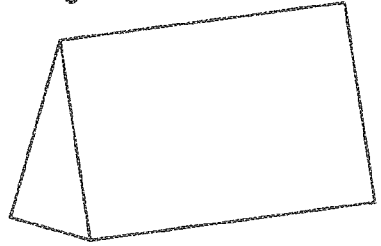
Figure 1I:
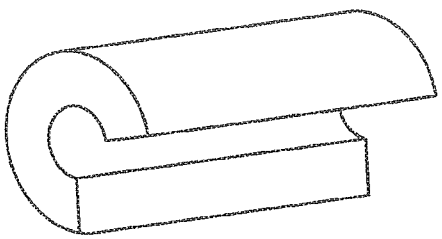
Figure 1J:
Figure 2A:
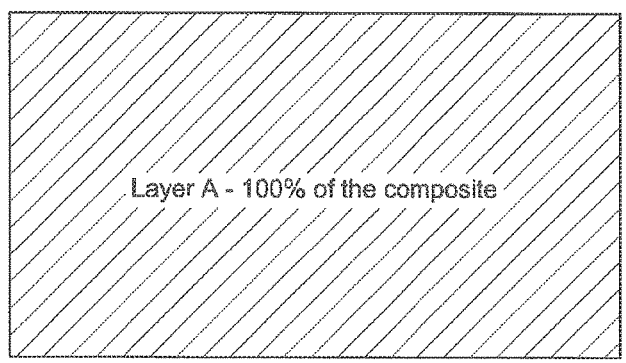
Figure 2B:
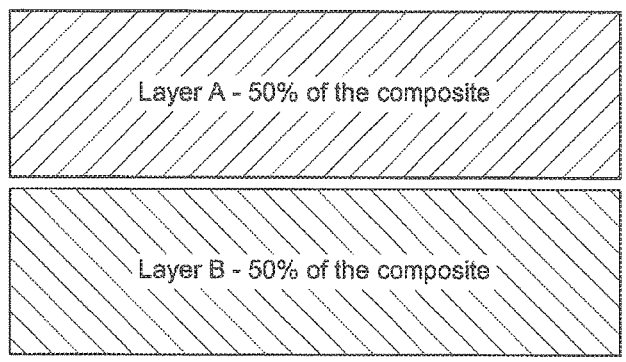
Figure 2C:
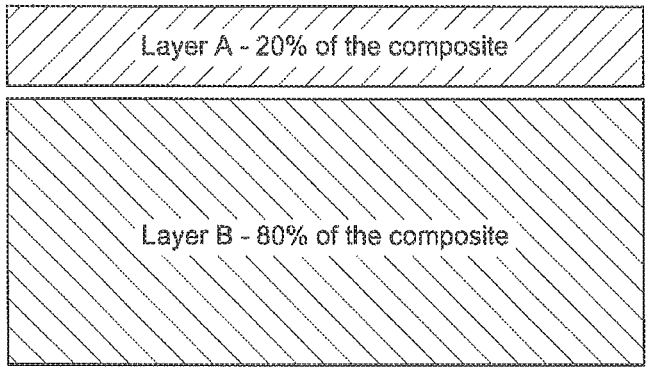
Figure 2D:
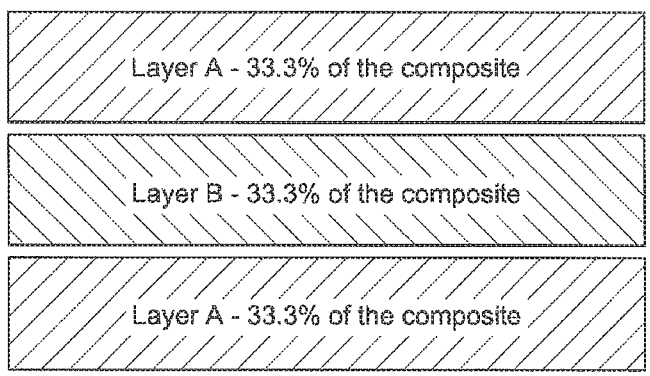
Figure 2E:
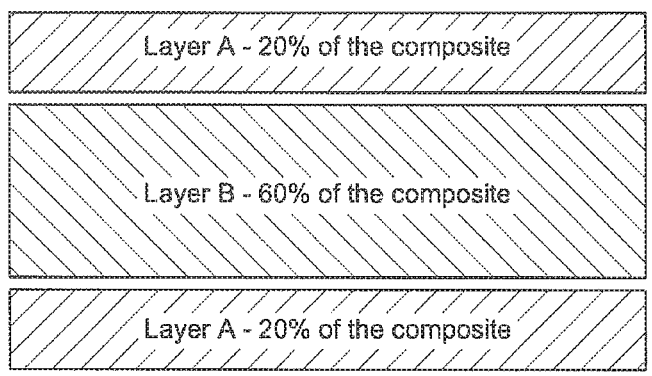
Figure 2F:
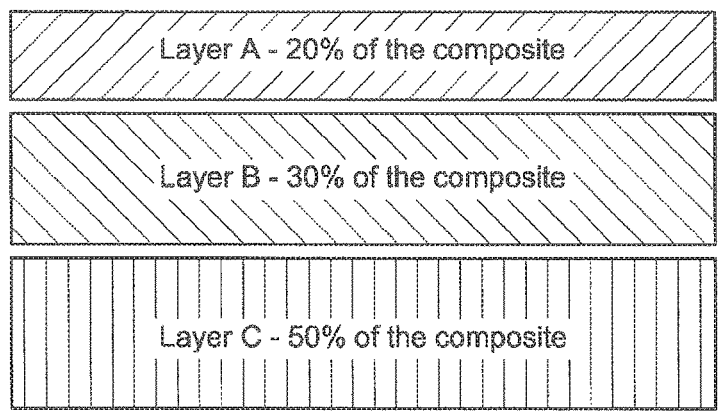
Figure 2G:
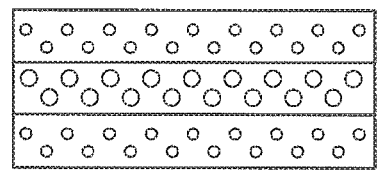
Figure 2H:
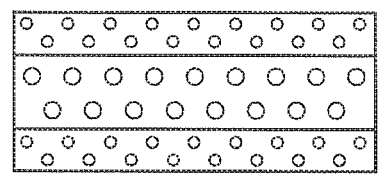
Figure 2I:
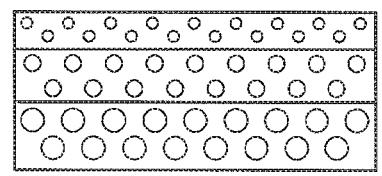

PLA polymers are produced by several manufacturers throughout the world. Polylactic acid is a polymer that acts very much like polyester such as polyethylene terephthalate (PET) but is biodegradable thermoplastic aliphatic polyester and is made from renewable resources, such as corn starch, beets, and sugar cane. Its CAS# is 26100-51-6.

Nature Works (a subsidiary of Cargill) is the largest producer of poly lactic acid (PLA) in the United States and is marketed under the Ingeo® brand name. Polymers are produced in a wide range of Melting points from 100 to 170° C. Although PLA has a glass transition temperature of 55-60° C., this does not affect its stability in boiling water of 100-105° C.

In U.S. Pat. No. 8,828,895, for example, a low melt temperature fiber is disclosed as a mono-component mon-constituent PLA fiber having amorphous and crystalline forms such that there are crystalline PLA fibers (or high melt PLA fibers) and there are amorphous PLA fibers (or low melt PLA fibers). When the amorphous PLA fibers melt, high melt PLA fibers bond together at intersections of where the low melt fibers have melted between the high melt or crystalline PLA fibers. By regulating the percentage of low melt fibers and processing conditions, the various properties of thickness, porosity, tensile strength and elongation can be controlled.

In the present invention, a carding line consisting of 3 cards, each 3.0 meters wide made by Hollingsworth were used. While each card can be fed a different blend of fiber sizes, fiber shapes, or fiber types, in this trial, each card was fed with Nonwoven Network PLA fiber type PS 2650 at 1.5 denier×38 mm, which have a melt Temperature of 165-170° C.

Each card had randomizer rolls on the exit to form a web with about 2:1 machine vs. cross-machine orientation. The three webs were collected on a conveyor apron. The web then passed under a powder applicator (very similar to a bakery flour sifter, except it is 3 meters wide. By selecting the correct screen for the sifter, the speed of the rotating brush inside the screen, and the speed of the web, the amount of powder applied to the web can be controlled.

The web with both high melt fibers and low melt powder is then passed through an oven at a temperature of 150° C. to melt the powder but not the high melt fibers.

Upon exiting the oven, the web is passed through nip rolls (one steel, the other cotton surfaced) to condense the web and bond the powder to the high melt fibers.

Various PLA powders were used with different melt points. ICO Polymers (a division of A Schulman, Inc.) produced Ecorene NW60 from an Ingeo polymer in a 100 mesh size with particles ranging from 50 to 125µ. The mean was 100µ. The specific gravity was 1.24, the same as the specific gravity of the PS2650 fibers.

Other powders were tested including powder made from Ingeo 6060D with a melt temperature of 125-130 and Ingeo 6302D with a melt temperature of 125-135° C.

All had excellent results and elongation could be controlled to get more elongation than standard production using both Low and High melt fibers.

An unexpected and added benefit was that although grinding the PLA pellets into powder added some costs, we were able to avoid making the low melt PLA fibers which was a significant cost savings. We were also able to use a lower percentage of the PLA powder versus low melt PS1801 PLA fibers, further reducing the cost. Fabric weight produced ranged from 16 grams/sq meter to 90 grams/sq meter.

A further unexpected finding was the use of Allantoin in the PLA fibers and/or the PLA powder reduces chlorine from liquid infused through the nonwoven pouch or bag made in the present invention. Allantoin is present in botanical extracts of the comfrey plant and in the urine of most mammals, except humans. Chemically synthesized bulk allantoin, which is chemically equivalent to natural allantoin, is safe, non-toxic, compatible with cosmetic raw materials and meets CTFA and JSCI requirements.

In another series of trials, the powder Allantoin ($C_4H_6N_4O_3$) was added to the molten low melt temperature PLA fibers during manufacture. Trials were conducted with loadings of 0.1 to 1.0%. Since Allantoin is a clear odorless powder, it did not affect the color of the fiber. Allantoin, also known as Glyoxldiureide, has a specific gravity of 1.45, which also helps the tea bags sink in water, which helps accelerate the brewing of tea and coffee.

Allantoin powder was also mixed with the PLA powder at a rate of 0.1 to 2.0% and was applied to the carded blend above.

In both cases, when the low melt fibers or low melt powder with Allantoin were melted in the oven and then bonded with the press rolls, the Allantoin was available to scavenge the chlorine from the water.

The best results came from blending the Allantoin with the powder. Since the powder melts at 135° C., this was well below the melting point of Allantoin, which is 230° C.

Nonwoven webs are porous, textile-like materials composed primarily or entirely of fibers assembled in flat sheet form. The tensile properties of such webs may depend on frictional forces or on a film-forming polymeric additive functioning as a binder. All or some of the fibers may be welded to adjacent fibers by a solvent or by the application of heat and pressure.

Nonwoven webs currently are employed in a variety of products such as diapers, napkins, sterilization wraps; medical drapes, such as surgical drapes and related items; medical garments, such as hospital gowns, shoe covers, and the like to name but a few. The nonwoven webs can be utilized as a single layer or as a component of a multilayered laminate or composite. When a multilayered laminate or composite is present, often each layer is a nonwoven web. Such multilayered structures are particularly useful for providing improved performance in strength properties.

In order to improve the performance of a nonwoven-containing product, it sometimes is necessary to modify certain characteristics of the fibers of which the web is composed. A classic example is the modification of the hydrophobicity of fibers by a topical treatment of the web with a surfactant or through the use of a melt additive.

The use of a topical treatment or melt additive has the draw back when the non-woven is used in the food industry or related to contact with human skin or human digestion. The present invention avoids the use of such surfactants and topical treatments and provides additional unexpected results.

The diameter of fibers will affect the nesting or stacking of the fibers during web formation. Further, the percentage of low melt fibers will affect the density and porosity of the web.

The ability to produce a web with multiple layers presents the ability to create webs of different porosity, thickness, and stiffness. Webs were produced with three layers A B A. All fibers were mono-component, mono-constituent PLA.

It is within the purview of this invention that different layers, depending on the embodiment, contain different diameters, different ratios of high & low melt, and different shapes as well as the weight of each layer.

The A layers were produced with 50% 1.5 d×2" High Melt (170° C.) PLA (PS 2650) and 50% 2.5 d×2" Low Melt (130° C.) co-PLA (PS1801).

The B layer (in the center) was produced with 75% 2.5 d×2" High melt (170° C.) PLA (PS2650) and 25% 2.5 d×2" Low melt (130° C.) Co-PLA (PS1801). Note that B has 2.5 d vs. 1.5 d high melt fibers which are about 2.5× greater in diameter and only 25% vs. 50% of the low melt.

The fibers were blended separately and then fed into the card feeders. All cards were Hergerth 3 in wide roller cards with randomizing rolls. The first two cards produced the A layer and fed the layer onto a collecting apron. The next two cards produced the B layer and it onto the apron on top of the A layer. The final 2 cards produced the A layer and fed it onto the same apron on top of the B layer, creating a single web of A B A layers.

The collective web was then delivered to a heated two roll calendar machine with the rolls heated by Hot Oil to a temperature of 150° C.

The fabric weight was adjusted between 80 to 120 grams per square meter and a weight of 90 grams per square meter was chosen as having the best properties.

The stiffness improved to fit the Senseo® brewing machines and produce an excellent cup of coffee without leaking around the edges.

The porosity of the 90 gsm ABA web was tested against other weights of mono-component, mono-constituent PLA webs ranging from 16 to 90 gsm. The porosity was measured with a Frazer® air-permeometer and measured in liters/m$^2$/second. Industry standard webs made from cellulose with either a Polyethylene or PLA bi-component fiber at 30% were compared by weight in the following table and graph shown in the drawings.

The net effect is that a 90 gsm web was obtained with excellent airflow or permeability, but the cellulosic web had virtually no airflow.

Up to this point, only round, solid fibers of mono-component, mono-constituent PLA fibers were used.

Fibers made in other shapes were investigated. The shapes included a triangle, mock hollow or "C" shaped, and ribbon or flat (See FIGS. 2A-2I).

These fibers were produced in the same manner as round. The molten polymer (PLA) was pumped by a metering pump through a metal spinneret. (Note: The low melt Co-PLA was not produced (but could be in the future) as they would melt, flow, and lose their shape). The fibers were air quenched and then drawn at their Tg of 60° C. at a ratio of 3.5:1 to obtain desired crystallinity. The fibers were crimped, heat set and cut to length.

It was found that these shaped fibers do not affect the air flow, but improve the "crema" or foam in the finished cup of coffee.

It was also learned that blending in synthetic cellulosic fibers, such as rayon, aceta(e, or Lyocell (Tencel®) solved a problem of heat effect on coffee and tea bag formation. Tencel® (generic name Lyocell) is a sustainable fabric regenerated from wood cellulose. Lyocell regenerated cellulose fiber is made from dissolving pulp (bleached wood pulp). It was developed and first manufactured for market development as Tencel® in the 1980s by Lenzing Fibres. Standard forming machines (such as IMA or Cloud) do not have adequate heat controls to maintain a precise temperature over a wide range of running speeds. Hence, there were times when the mono-component, mono-constituent PLA fibers would melt, creating flaws in the pouch or pad.

By blending in from 5 to 60% of the synthetic cellulosic fibers with the high and low melt PLA, there was a greater temperature range for pad formation available. Tencel® was found to be the easiest to blend with the PLA fibers. The net result was a fabric with higher strength at the melting point of the high melt PLA. While blending in the synthetic cellulose fibers negated the recyclability attribute, the end product was still suitable for tea and coffee pads, bags, or pouches. The fabric was still biodegradable and since Tencel® has a specific gravity compared to 1.24 for PLA, the blended fabric had equal or better ability to sink in the cup rather than float.

Finally, hydrophilic finishes or lubricants were applied to the fibers during fiber production. These finishes were provided by Goulston Technologies, Inc. of Monroe N.C. These finishes were designed to meet FDA and German BfR requirements for food quality. Goulston finishes such as PS-11473, PS-10832, and PS 12062 were tried. All were heat set at 130° C. during the fiber production process to thoroughly bond them to the fibers. The heat-setting bonded the finishes so that they were not released into the boiling water (100-110° C.) used for Tea Bags, coffee pads, or other pouches.

The water flow appeared to improve as the color of the water darkened at a much faster rate than PLA fibers made only with an anti-stat such as Goulston AS-23. These finishes were totally compatible to provide excellent carding and fabric formation. The hydrophilic properties and the 1.24 specific gravity of PLA, resulted in bags that would sink and wet out easily, resulting in a faster brew cycle.

Another advantage of the invention is that since the pouch or bag is hydrophilic it sinks. This advantage is seen in a tea or coffee bag where most paper or other bags float on the top and give minimal diffusion of the coffee or tea contents. By having the bag sink diffusion of the contents is further given. Another advantage is as the non-woven web is exposed to water, it becomes clearer showing the contents of the bag or pouch. The bag or pouch has the benefits of using less contents such as coffee or tea leafs to accomplish the same strength of beverage. In addition diffusion time is decreased since the pore size is relatively maintained using the mono-component fiber. This invention is not limited to beverage pouches and can be utilized in any application that requires diffusion of contents through a pouch or bag. The advantages of biodegradation, recyclability, decreased amount of contents needed, decreased diffusion time, and clarity of the pouch is all realized in the present invention.

In view of the disclosed description, it will now be apparent to those skilled in the art that other embodiments, improvements, details, and uses can be made consistent with the letter and spirit of the foregoing disclosure and within the scope of this patent, which is limited only by the following claims, construed in accordance with the patent law, including the doctrine of equivalents.

A preferred embodiment of the invention was made, and is explained as follows, including all or most of its fibers in bi-component form and its production of mono-component PLA fiber made from Fiber Innovation Technologies (Type T811) was blended with core/sheath bi-component (BiCo) fibers with PLA in the Core and Co-PLA in the sheath. The core/sheath area ratio was 50/50%. Fibers were produced with a ratio between 80/20% and 20/80%. Other fiber producers such as Palmetto Synthetics and Foss Manufacturing Company can make these fibers. PLA fibers typically are made using lactic acid as the starting material for polymer manufacture. The lactic acid comes from fermenting various sources of natural sugars. These sugars can come from annually renewable agricultural crops such as corn, sugar cane, or sugar beets, or other sugar crops. The polymer must be completely dried prior to extrusion to avoid hydrolysis. PLA is an aliphatic polyester and the helical nature of the PLA molecule makes it easier to crystallize than PET. The PLA can be extruded into a fiber using standard PET fiber equipment.

In the case of the mono-component PLA fiber, the high temperature variant with a melt temperature of 175° C. is extruded into a fiber. The initial fiber is then drawn 3.5 times its length to get to the required 1.5 denier. It is then crimped and heat set to 140° C. to improve the crystallinity and stabilize the crimp. It is then cut to 1.5" (38 mm). In the case of the Bi—CO fiber, a melt spinning line using the co-extrusion spinerettes made by Hills Inc., of Melbourne Fla. was used. The spinerettes of the line produced a fiber similar to FIG. 3. The higher melting (175° C.) PLA is in the core, while the lower melting Co-PLA (135° C.) is in the sheath. Generally, the low melt Co-PLA is fully amorphous, which makes it easier to melt and flow around the crystalline mono-component PLA fibers. The core PLA fiber remains and combines with (bonds to) the mono-PLA fiber at many cross-over points in the web for strength. A web comprising PLA fibers has two different melting points, 145 C-175 C and 105 C-165 C, respectively. The PLA fibers have a melting (softening) point of 145 C to 175 C and the Co-PLA fiber, mono-component is CoPLA with a melt temperature from 105 C to 165 C.

Figure 3:
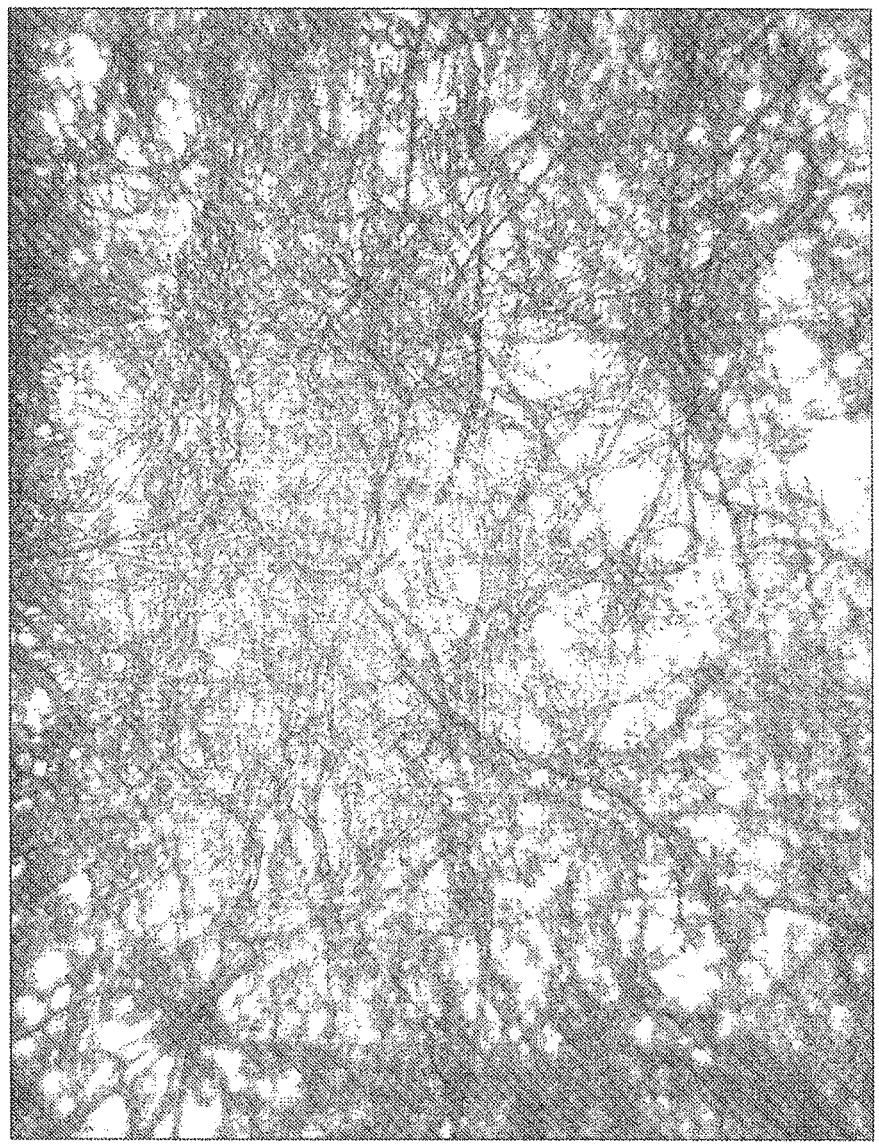
FIG. 3 illustrates three different fibers. Large diameter, smaller diameter and low melt forming fused bond points at 4× magnification.
Figure 4:
FIG. 4 illustrates another view of FIG. 3 at 10× magnification showing low melt bond points and that the low melt fiber ceases to be a fiber.

FIG. 3 illustrates three different fibers. Large diameter, smaller diameter and low melt forming fused bond points at 4× magnification. FIG. 4 illustrates another view of FIG. 3 at 10× magnification showing low melt bond points and that the low melt fiber ceases to be a fiber.

Figure 5:
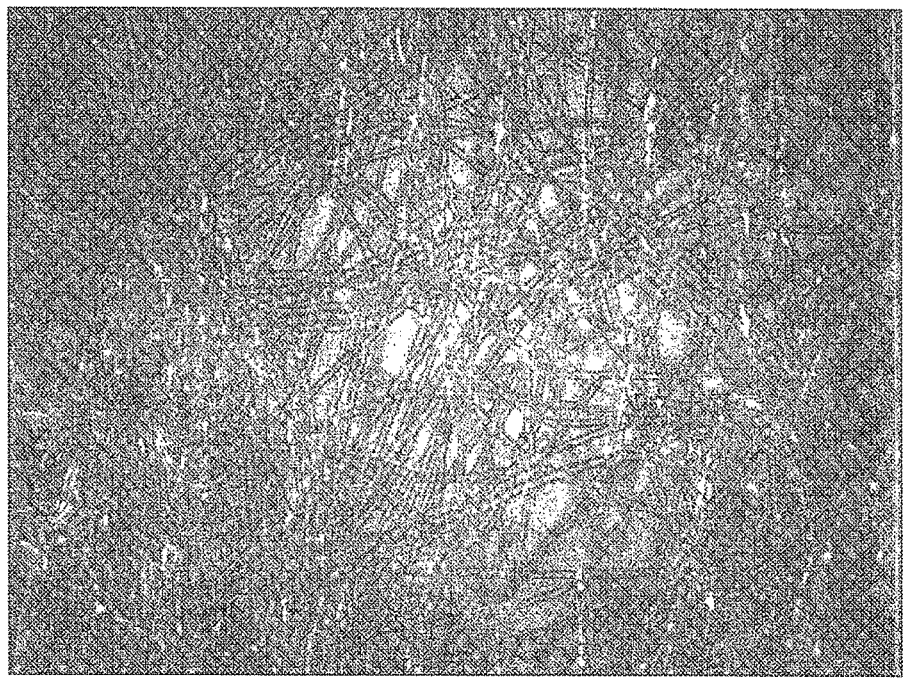
FIG. 5 is photomicroscope slide (1) at 40× magnification power showing an 18 gsm web with 30% (by weight) co-PLA/70% PLA which exhibited excellent strength and superb sealing characteristics. It should perform equally well at lighter weights from 12 to 20 gram per square meter (gsm)
Figure 6:
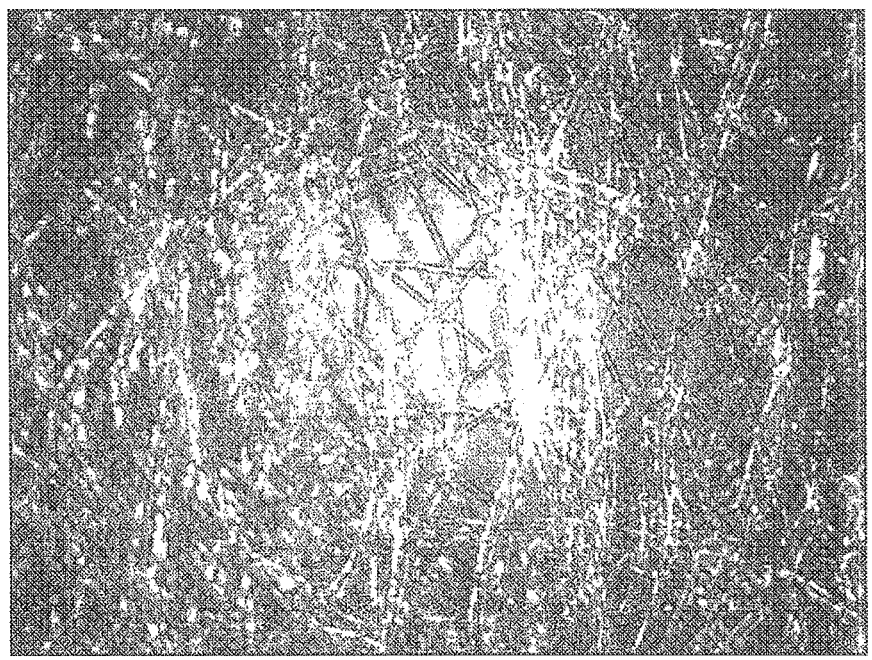
FIG. 6 is photomicroscope slide (2) showing an 16 gsm web with 10% co-PLA/90% PLA blend, which exhibited adequate strength but did not have enough low melt fiber to seal effectively.

FIG. 5 is photomicroscope slide (1) at 40× magnification power showing an 18 gsm web with 30% (by weight) co-PLA/70% PLA which exhibited excellent strength and superb sealing characteristics. It should perform equally well at lighter weights from 12 to 20 gram per square meter (gsm). FIG. 6 is photomicroscope slide (2) showing an 16 gsm web with 10% co-PLA/90% PLA blend, which exhibited adequate strength but did not have enough low melt fiber to seal effectively.

Figure 7:
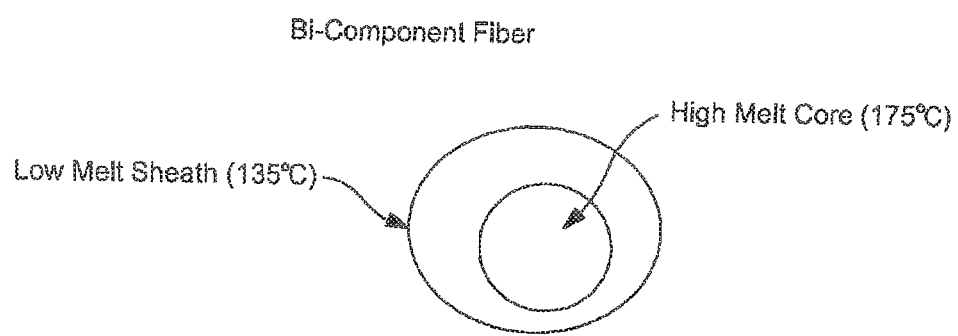
FIG. 7 is a drawing of a hi-component fiber with a high melt core (PLA @ 175° CM) and a low-melt sheath (Co-PLA @ 135° C.)
Figure 8:
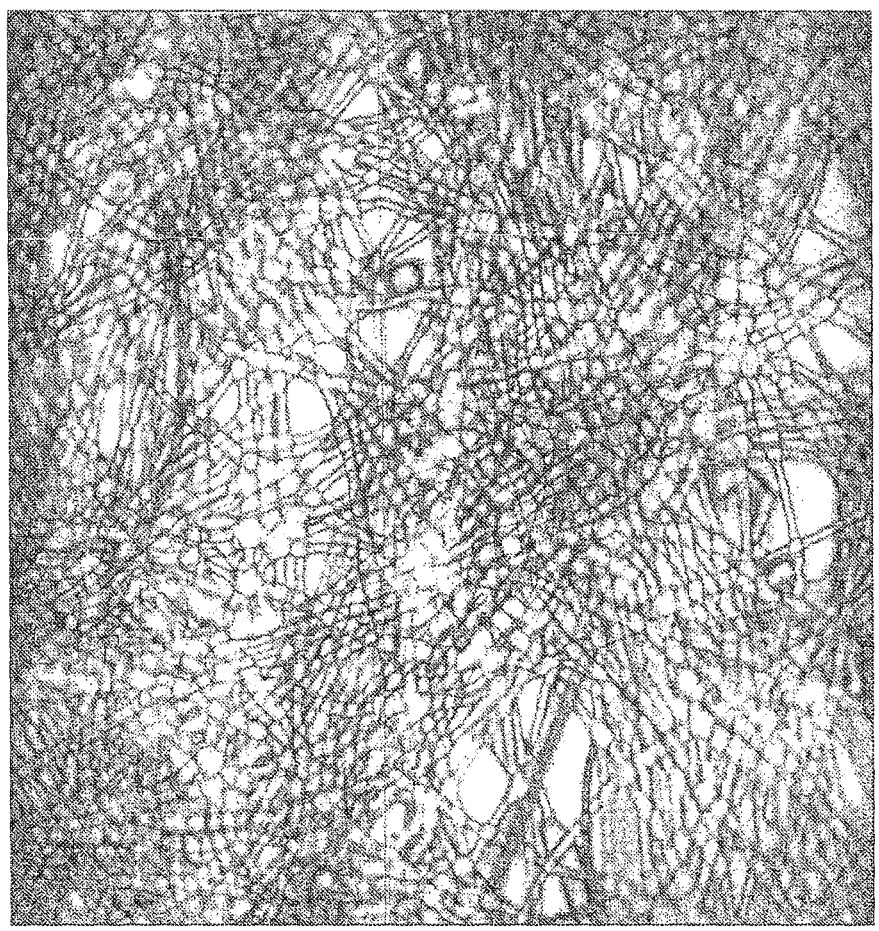
FIG. 8 is a Microscope slide of 85/15% blend 8 gsm-40 power.
Figure 9:
FIG. 9 is a Microscope slide of 80/20% blend at 18 gsm-40 power.
Figure 10:
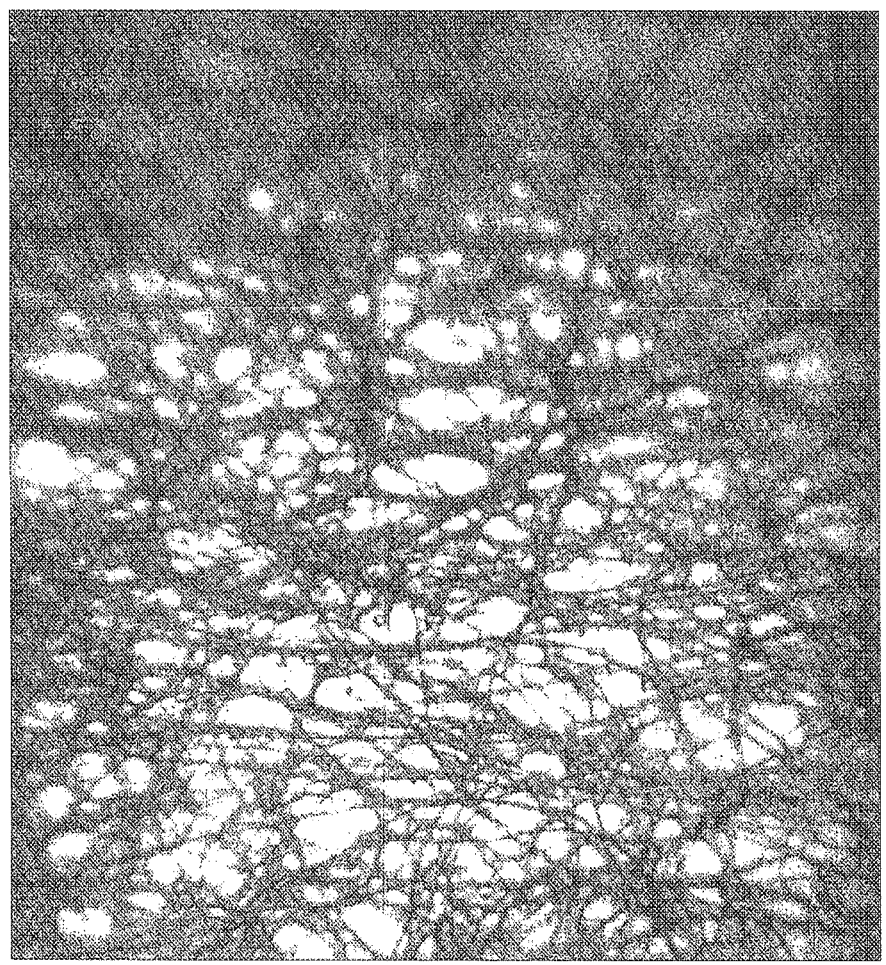
FIG. 10 is a microscope slide of 80/20% blend at 18 gsm-100 power.
Figure 11:
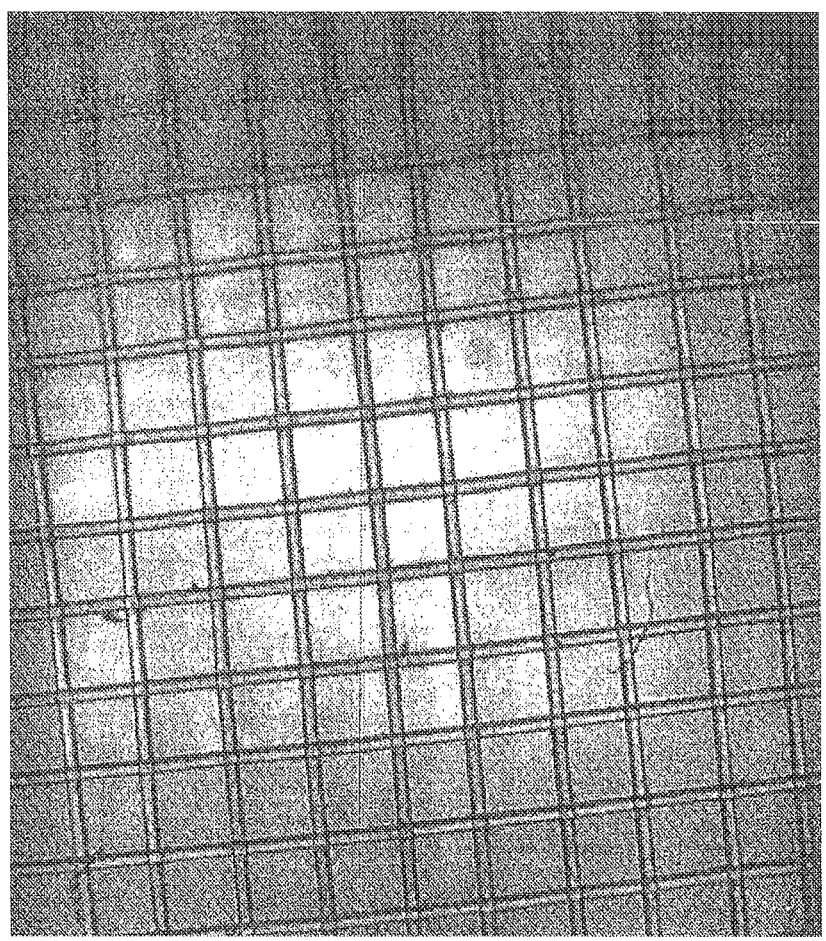
FIG. 11 is a microscope slide of standard paper.
Figure 12:
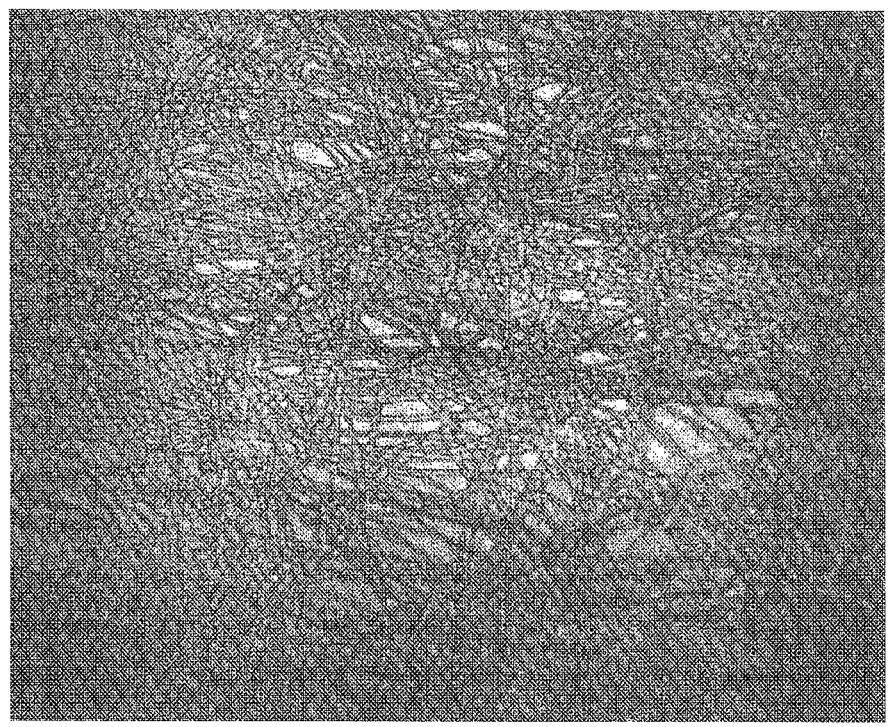
FIG. 12 is a microscope slide of a Japanese made nylon fabric.

FIG. 7 is a drawing of a bi-component fiber with a high melt core (PLA @ 175° CM) and a low-melt sheath (Co-PLA @ 135° C.). FIG. 8 is a Microscope slide of 85/15% blend at 18 gsm-40 power. FIG. 9 is a Microscope slide of 80/20% blend at 18 gsm-40 power. FIG. 10 is a microscope slide of 80/20% blend at 18 gsm-100 power. FIG. 11 is a microscope slide of standard paper and FIG. 12 is a microscope slide of a Japanese made nylon fabric.

Figure 13:
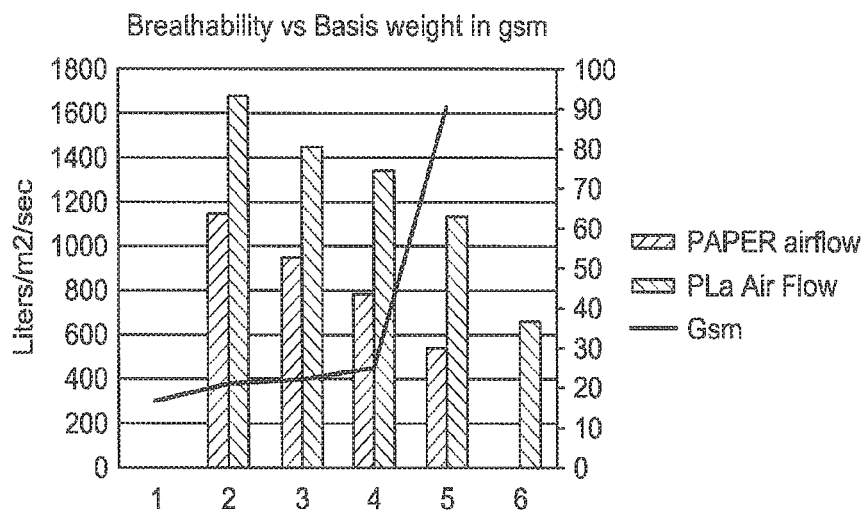
FIG. 13 is Table I showing a comparison of paper airflow with PLA airflow and Graph A showing the relationship of breathability properties to GSM.

FIG. 13 is Table I showing a comparison of paper airflow with PLA airflow and Graph A showing the relationship of breathability properties to GSM described herein.

The blend percentages were varied from 90% PLA/10% BiCo to 60% PLA/40% BiCo. The 70/30% produced the best fabric for strength and sealability. It is also possible to make a blend of crystalline PLA (175° C. melt point) and a mono-component fiber made from 100% Co-PLA (melt point between 135° and 165° C.) Blending is performed by weighing out the desired percentages of PLA and BiCo fibers either manually or with automated weigh feeders. The two fibers are layered on top of each other and fed into an opener which has feed rolls, feeding the fibers into a cylinder with teeth that pulls the clumps into individual fibers. The fibers are then blown into a blending bin to create a homogeneous mixture by first layering the fibers uniformly in the bin and then cross-cutting the layers with a spiked apron which feeds the fibers to a carding system.

The carding system consists of two feeding hoppers. The first acts as a reserve holding bin to ensure continuous supply. The second feeding hopper has a continuous scale with a load cell that provides a set weight feed to the card. The card is a series of interacting cylinders covered with toothed wire that tears and combs the fibers into a parallel web.

The fabric weights were varied from 12 to 20 gsm, with the 18 gsm chosen for testing. It is believed that the 16 gsm (not run) will provide the best characteristics.

The production line was a Asselin-Thibeau line with 3 carding machines, each 2.3 meters wide. The web was run in a straight line and fed into a calendar with 460 mm diameter rolls heat with thermal oil at a temperature of 130° C. to 152° C. Line speeds were 40 meters per minute at a finished width of 2.0 meters.

If a parallel web is desired, the fibers coming straight out of the carding system are combined with the other two cards and thermo-bonded. This generally results in a Machine Direction (MD)/Cross Machine Direction (CMD) strength ratio of 4:1. If a more balanced strength ratio is desired then a "randomizer" roll system may be added to one or more cards. The result can be MD/CMD strength ratio up to 1.5:1.

By controlling the carding system and fiber orientation, the fibers can be aligned in a manner to control the apertures or openings in the web to enhance rapid infusion of the hot water.

The rolls were slit to a width of 156 mm (6.14") for the Tea Bag machine.

The tea bag machine was a model ASK020 made by Miflex Masz. Two rolls were placed on the machine and centered on the mold. The correct amount of tea was deposited and the top and bottom sheet sealed automatically at a temperature of 135 C with a dwell time between 0.5 and 0.8 seconds.

The present invention cuts easily on standard tea/coffee packaging machines with a simple knife device and creates minimal amount of lint or loose fibers.

The web maintains its pore size during the infusion with hot liquids because the fibers do not swell. This enhances the flow of water into the tea or coffee, reducing the brewing time.

Because the web fibers do not swell, the risk of gas pressure build up is eliminate and thus the risk of bag breakage and particle dispersion is eliminated.

Using boiling water, the infusion time is reduced to one (1) minute. When pressed, the infusion liquid completely leaves the container (bag or pouch), leaving a silky, translucent surface.

Recycling of PLA is very easy, and depends on the place in the process. During fiber manufacture, all of the fibers from both spinning and drawing can be re-extruded to pellets by densifying the fiber scrap using an "Erema" or "Mechanic Moderne" recycling line (There are many others that will also work). The equipment will density the fibers and partially melt them to pre-dry to drive off any moisture. The dense particles are forced into a vented extruder to remove all of the moisture. The PLA is then fully melted and extruded and filtered to form pure amorphous pellets. The pellets can then be blended with virgin pellets to make new fiber. During the Thermo-Bond process, scrap fiber, edge trim, and defective fabric can be baled and shipped back to the recycling system described above. During the Tea-Bag process, the trimming scrap and "skeleton" scrap, especially from making round pouches, can be baled and reprocessed as described above. Finally, the tea bags can be composted after use and the PLA will turn back into sugars which can be used to make more PLA.

The present invention may also be used as pouches for: lemonade, herbal sachets, soap powder, chemicals and chlorine for pools and spas, decontaminating liquids, coloring of liquids, dehumidifying chemicals, carriers for phase-change materials for heating or cooling, tobacco pouches, and all materials that can be placed in a heat/ultra sound activated scalable container.

A further preferred embodiment comprises a tea bag material and end product made in whole or in part of a mono-component fiber with self-bonding property to similar fibers or other to produce effective web material and effective end product.

A preferred mono-component is co-PLA with a melt temperature of 135° C. Such a fiber was produced in a 1.3 denier×38 mm fiber. This produced a fiber which is 100% binder as opposed to a bi-component fiber, generally consisting of 50/50 PLA/Co-PLA. The Mono-component fiber was blended with standard PLA fiber in a ratio of 85% PLA/15% CoPLA. The blend was processed on a carded web line at 18 and 20 gsm. The result was a significantly stronger web than that produced with the bi-component fiber. The web was clearer and less opaque than the one with the Bi-co fiber. This is a very desirable attribute.

In a second trial, the mono-component Co-PLA fiber was blended with the type 811 PLA fibers in a ratio of 80/20%. The web was produced in a weight of 18 and 20 gsm. The strength increased and the fabric was less opaque or more translucent. Rolls of both of the types were then slit to appropriate widths and processed on tea bag machines. A further advantage was that the PLA/CoPLA blend retains less water that the standard paper absorbs. While both the PLA and Standard paper weighed 18 gsm dry, the PLA reached 90 gsm when fully saturated with water, while the standard paper reached 200 gsm.

A first trial was on a Fuso machine replacing an expensive nylon fabric. The tea bags formed well and the seams were stronger than those made with the nylon fabric. The 18 gsm with the 80/20 blend provided the best results.

To improve strength, uniformity, and fiber distribution, one of the carding machines (out of 5) was modified by placing a randomizing unit on the doffer or take off rolls. On a standard card machine, the fiber orientation is generally 5:1 in the machine versus cross machine direction and can be optimized to 15:1. With the randomizing rolls, the orientation is about 1.5:1 for the card with the randomizer. The resultant composite web had an orientation of between 2:1 and 3:1. This was a significant improvement. The resultant webs showed no degradation of strength during wet conditions that standard tea bag paper exhibits.

Figure 14:
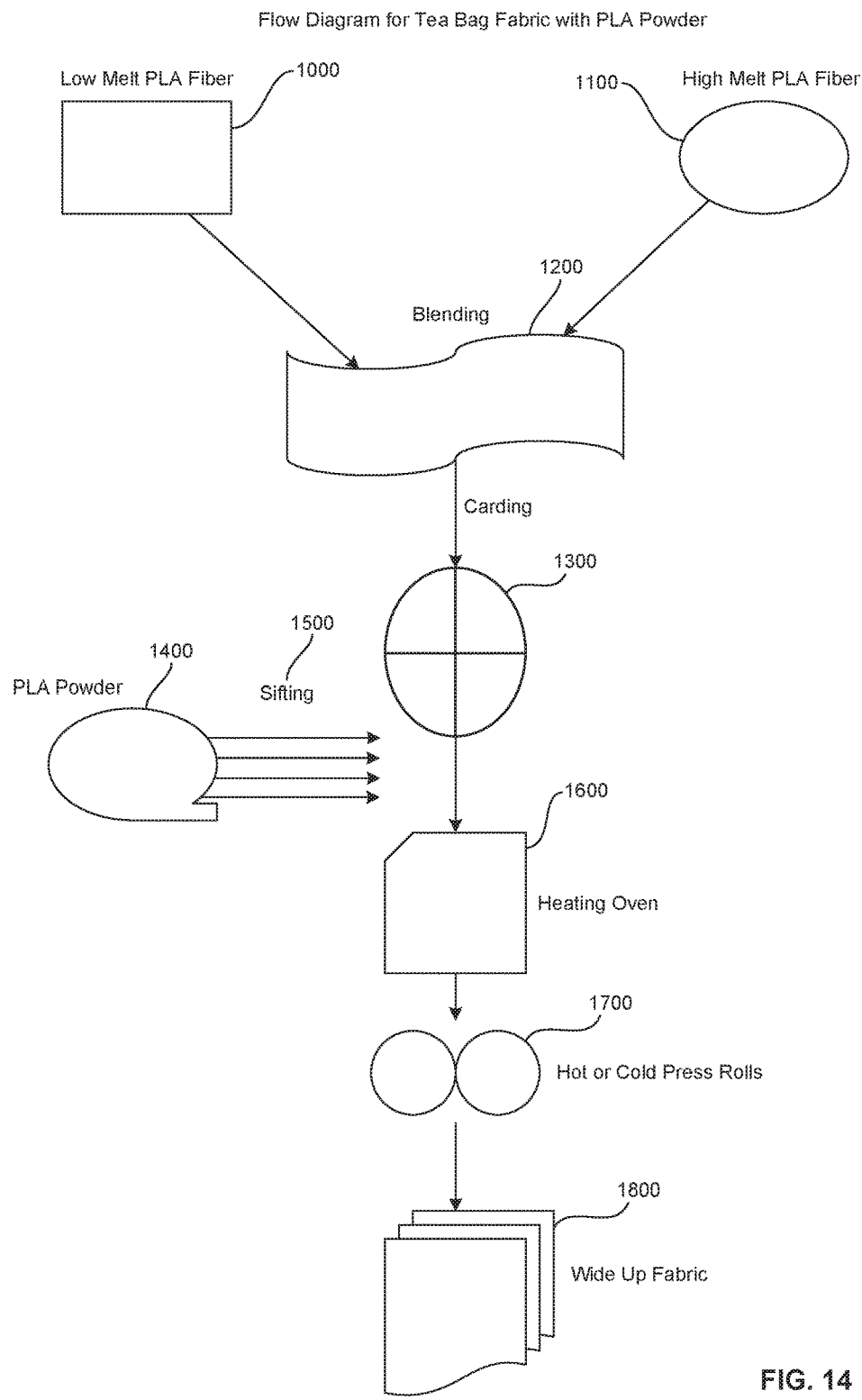
FIG. 14 is a flow chart showing one embodiment of the process utilizing the PLA fibers and PLA powder.

Adverting to FIG. 14, shown is a flow chart showing one embodiment of the process utilizing the PLA fibers and PLA powder. Low melt PLA fiber 1000 is blended with high melt PLA fiber 1100. Depending on the embodiment, either the low melt PLA fiber or the high melt fiber may be used alone or together. Blending 1200 of the fibers if joined together may be done by any method known to those skilled in the art. A carding process 1300 may or may not be done, depending on the embodiment, as previously shown and described. A PLA powder generated by grinding PLA pellets 1400 or by utilizing PLA powder in its original form is then sifted by a sifter 1500. The sifter has a mesh that controls the particle size of the PLA powder applied to the PLA fiber. A heating oven 1600 then melts the PLA powder to bind the PLA fiber together. Hot press rolls 1700 is used to made wide up fabric or non-woven webs 1800. This fabric may be utilized to make pouches bags or the like depending on the embodiment for use in infusion of liquids to pass through various contents of the infusion package as described herein, hut not limited to, the examples given.

It will now be apparent to those skilled in the art that other embodiments, improvements, details, and uses can be made consistent with the letter and spirit of the foregoing disclosure and within the scope of this patent, which is limited only by the following claims, construed in accordance with the patent law, including the doctrine of equivalents.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A nonwoven web for producing beverage infusion pouches and bags, comprising:
   a plurality of Polylactic Acid (PLA) fibers for forming a non-woven web through dry thermo-bonding; said Polylactic Acid (PLA) fibers having a crystalline portion;
   an amorphous PLA powder added to said Polylactic Acid (PLA) fibers; and
   an amount of Allantoin or an amount of sodium thiosulfate;
   wherein said PLA fibers and said PLA powder form together pore sizes of said non-woven web that are maintained when infused with hot or non-heated liquids for enhancing flow;
   said non-woven web contains no plasticizers or surface treatment additives, and is formed without the use of plasticizers and surface treatments;
   said non-woven web is biodegradable and recyclable; and
   said Allantoin or said sodium thiosulfate is contained in the PLA fibers, or in the PLA powder, or in both the PLA fibers and the PLA powder.

2. The nonwoven web as in claim 1, wherein said amount of Allantoin is from 0.1 to 2.0%.

3. The nonwoven web as in claim 1, wherein said amount of Sodium Thiosuflate is from 0.1 to 2.0%.

4. The nonwoven web as in claim 1, wherein the PLA fibers have a fiber length between about 20 mm to 90 mm.

5. The nonwoven web as in claim 4, wherein the PLA fibers have a length of 38 mm.

6. The nonwoven web as in claim 1, where in the PLA fibers have a denier between 0.8 and 15 denier.

7. The nonwoven web as in claim 6, wherein the PLA fibers have a denier between 0.9 and 3.0 denier.

8. The nonwoven web as in claim 1, wherein the PLA powder has a melt temperature of 65 to 160° C.

9. The nonwoven web as in claim 1, wherein the PLA powder has a particle size between 15 and 250µ.

10. The nonwoven web as in claim 1, wherein the weight of the nonwoven web ranges from 8 to 150 grams per square meter.

11. The nonwoven web as in claim 1, wherein the weight of the nonwoven web ranges from 15 to 90 grams per square meter.

12. The nonwoven web as in claim 1, wherein the PLA fibers have a melt point from 125 to 175° C.

13. The nonwoven web as in claim 1, wherein the PLA powder has a melt point from 100 to 150° C.

14. The nonwoven web as in claim 1, wherein the PLA powder is between 5% to 60% by weight based on the weight of the web.

15. The nonwoven web as in claim 1, wherein said PLA fibers are formed in different shapes selected from the group consisting of: round, triangle, mock hollow or "C" shaped, ribbon, flat and any combination thereof.

16. The nonwoven web as in claim 1, wherein said nonwoven web is made of a plurality of layers up to and including 7 layers selected from the group consisting of: layer A, layer B, layer C, layer D, layer E, layer F, layer G, and any combination thereof.

17. The nonwoven web as in claim 16, wherein said plurality of layers is sequenced to have adjacent layers different or adjacent layers the same.

18. The nonwoven web as in claim 1, further including a pouch or bag with at least one of the following: Lemonade, herbal sachets, coffee, tea, hot chocolate, soap powder, chemicals and chlorine for pools and spas, decontaminating liquids, coloring of liquids, dehumidifying chemicals, carriers for phase change materials for heating or cooling, tobacco pouches, and any combination thereof.

19. The nonwoven web as in claim 1, further including a pouch or bag formed from the PLA fibers and PLA powder.

20. The nonwoven web as in claim 1, wherein the PLA fibers in the nonwoven web are randomized using randomizing rolls.

21. The nonwoven web as in claim 1, wherein the PLA fibers are of a higher melting point than the PLA powder.

22. The nonwoven web as in claim 1, wherein the non-woven web is a beverage infusion package for providing biodegradability after usage and recyclability of waste materials during each step of the manufacturing process from the polymer through to package formation.

23. The nonwoven web as in claim 22, wherein said beverage infusion package further includes at least one of the following: Lemonade, herbal sachets, coffee, tea, hot chocolate, soap powder, chemicals and chlorine for pools and spas, decontaminating liquids, coloring of liquids, dehumidifying chemicals, carriers for phase change materials for heating or cooling, tobacco pouches, and any combination thereof.

24. The nonwoven web as in claim 22, further including a string attached to said beverage infusion package, said string being made of mono-component, mono-constituent Polylactic Acid PLA fibers, and said string further attached to a tab.

* * * * *

UNITED STATES PATENT AND TRADEMARK OFFICE
CERTIFICATE OF CORRECTION

PATENT NO. : 9,988,205 B2
APPLICATION NO. : 15/062667
DATED : June 5, 2018
INVENTOR(S) : Stephen W. Foss and Jean-Marie Turra Page 1 of 1

It is certified that error appears in the above-identified patent and that said Letters Patent is hereby corrected as shown below:

In the Drawings

Fig. 13, Table 1, Column 1, Line 6, delete the first "90", and add --60--.

Signed and Sealed this
Thirteenth Day of August, 2019

Andrei Iancu
*Director of the United States Patent and Trademark Office*